(12) United States Patent
Schwier et al.

(10) Patent No.: US 7,202,972 B1
(45) Date of Patent: Apr. 10, 2007

(54) METHOD, COMPUTER PROGRAM PRODUCT AND SYSTEM FOR THE TRANSMISSION OF COMPUTER DATA TO AN OUTPUT DEVICE

(75) Inventors: Hartwig Schwier, Munich (DE); Juergen Grebner, Wilhelmsthal (DE)

(73) Assignee: Oce Printing Systems GmbH, Poing (DE)

( * ) Notice: Subject to any disclaimer, the term of this patent is extended or adjusted under 35 U.S.C. 154(b) by 0 days.

(21) Appl. No.: 09/936,373

(22) PCT Filed: Mar. 15, 2000

(86) PCT No.: PCT/EP00/02310

§ 371 (c)(1),
(2), (4) Date: Jan. 23, 2002

(87) PCT Pub. No.: WO00/55760

PCT Pub. Date: Sep. 21, 2000

(30) Foreign Application Priority Data

Mar. 15, 1999 (DE) ................................. 199 11 461

(51) Int. Cl.
*G06F 15/00* (2006.01)
(52) U.S. Cl. ..................... 358/1.9; 358/1.13; 358/1.15; 358/1.17; 715/500; 715/506; 715/515; 347/43
(58) Field of Classification Search ................. 358/1.9, 358/1.13, 1.17, 1.15; 715/500, 506, 515; 347/43
See application file for complete search history.

(56) References Cited

U.S. PATENT DOCUMENTS

| | | | | |
|---|---|---|---|---|
| 4,445,795 A | * | 5/1984 | Levine et al. ................. | 400/63 |
| 4,857,955 A | * | 8/1989 | Crandall ....................... | 358/1.9 |
| 4,887,128 A | * | 12/1989 | Jamali et al. .................. | 399/6 |
| 5,165,014 A | * | 11/1992 | Vassar ......................... | 358/1.13 |
| 5,465,322 A | * | 11/1995 | Hsu et al. ..................... | 358/1.15 |
| 5,504,843 A | * | 4/1996 | Catapano et al. ........... | 358/1.16 |
| 5,562,351 A | * | 10/1996 | Uematsu ...................... | 400/68 |
| 5,615,316 A | * | 3/1997 | Imai et al. ................... | 358/1.18 |
| 5,649,024 A | * | 7/1997 | Goldsmith ................... | 382/170 |
| 5,740,338 A | * | 4/1998 | Gauthier et al. ............ | 358/1.17 |
| 5,742,879 A | * | 4/1998 | Altrieth, III ................. | 399/139 |
| 5,845,302 A | * | 12/1998 | Cyman et al. ............... | 715/517 |
| 5,982,996 A | * | 11/1999 | Snyders ....................... | 358/1.15 |
| 5,983,243 A | * | 11/1999 | Heiney et al. ............... | 715/500 |
| 6,078,403 A | * | 6/2000 | Palmer ........................ | 358/1.18 |
| 6,108,672 A | * | 8/2000 | DeJoseph .................... | 715/505 |
| 6,236,463 B1 | * | 5/2001 | Cyman et al. .............. | 358/1.14 |
| 6,320,667 B1 | * | 11/2001 | Mitsuhashi .................. | 358/1.1 |

(Continued)

FOREIGN PATENT DOCUMENTS

EP 0 131 966 1/1985

(Continued)

*Primary Examiner*—Twyler Lamb
*Assistant Examiner*—Mark R. Milia
(74) *Attorney, Agent, or Firm*—Schiff Hardin LLP

(57) ABSTRACT

A method and system for outputting data from a computer to an output device, such as a computer, defines a master document in which variable and static data areas are defined. A variable data area is marked and variable data is inserted thereinto to provide a data stream with variable and static data. The marking is used to remove the variable data from the static data. The separated variable and static data is transmitted to the output device such as the printer. The static data is stored at the printer and is not sent to the printer for subsequent documents. The variable data is joined with the static data document by document in the printer.

21 Claims, 7 Drawing Sheets

U.S. PATENT DOCUMENTS

| | | | |
|---|---|---|---|
| 5,917,489 A | * | 6/1999 | Thurlow et al. ............ 715/809 |
| 6,330,073 B1 | * | 12/2001 | Sciatto ...................... 358/1.18 |
| 6,473,892 B1 | * | 10/2002 | Porter ........................ 717/106 |
| 6,481,752 B1 | * | 11/2002 | DeJoseph ..................... 281/5 |

FOREIGN PATENT DOCUMENTS

| | | |
|---|---|---|
| EP | 0 814 425 A2 | 12/1997 |
| EP | 0 898 235 A2 | 2/1999 |
| WO | WO 99/12337 | 3/1999 |

* cited by examiner

METHOD, COMPUTER PROGRAM PRODUCT AND SYSTEM FOR THE TRANSMISSION OF COMPUTER DATA TO AN OUTPUT DEVICE

BACKGROUND OF THE INVENTION

1. Field of the Invention

The present invention is directed to a method, a computer program product and a system or, respectively, an apparatus for the transmission of data from a computer system to an output device, particularly print data to a printer device.

2. Description of the Related Art

A printer device is connected to many computer systems. Different print data format have established themselves depending on the system environment. For example, the PCL and postscript print data formats are standard in the Windows® environment. Given these print data formats, the data (documents) to be output are sent to the printer completely packed for printing.

In contrast to the PCL and postscript formats that have just been described, print data can be separated into resources (scripts, forms, layouts, etc.) and variable data given other print data formats such as AFPDS (Advanced Function Presentation Data Stream) or IPDS (Intelligent Print Data Stream). The resources and the variable data are thereby merged in relatively late processing steps, i.e. only shortly before the printing. European Patent Document EP-A-0 131 966 discloses a corresponding printing system that receives a print job containing a plurality of documents from a host computer, whereby form data and variable data of a document are transmitted separately from one another. The form data, as well as data that occur multiply in a plurality of documents, are transmitted only once per print job, are stored in the printing system and are employed for printing a plurality of individual documents. The variable data, in contrast, are transmitted once per document.

Computers in a typical office environment (referred to as an office domain) are frequently equipped with a Windows® operating system or similar operating system such as Linux® and Macintosh®. The PCL and postscript print data languages are standard in this office domain, i.e. given relatively low printing outputs up to approximately 40 pages per minute. In contrast, the AFPDS (Advanced Function Presentation Data Stream) and IPDS (Intelligent Printer Data Stream) data streams are standard in the high-performance printing field above 40 pages per minute.

Specific properties of the data output given windows-like operating systems as well as their operating systems such as, for example, the program Word for Windows®, the print languages such as PCL® or PostScript® allocated to them, become especially clear given printout of series documents, i.e. given the use of what is referred to as the mail-merge function. Such series documents are usually composed of individual documents that are composed of static, repeatedly reoccurring data (referred to as a master or, master document) and modifiable/variable data that are introduced into the master or, respectively, into the master document. With reference to the overall document, the variable data in a series document generally only amount to a fraction of the data quantity. The static part thus defines the necessary performance parameters of the system (including, for example, the RAM memory, disk storage, transmission capacity, etc.) in order to achieve a performance-suited printing speed.

Relatively small documents, i.e. individual pages, reports or books (up to approximately 300 pages) can be printed without further ado as packed documents. In contrast thereto, printing series documents in this way can lead to substantial time delays because the static data must be continuously transmitted from the generating computer system to the printer device, i.e. with every individual document.

Another problem given this way of printing is the design of documents with auxiliary information, for example linking images in or the introduction of forms into the documents. These auxiliary information are frequently not produced together with the document to be printed out but often derive from a different data source and are sometimes designed in an involved way in order to be able to be employed for a plurality of applications.

When printing out documents from user programs, for example from Word for Windows®, the auxiliary information are previously generally inserted into the document via an editor (for example, via the Word program). When this document is to be multiply output, particularly as a series document, then there is again the problem that the auxiliary information must be processed given each document, i.e. the data stream repeatedly contains the same information and, thus, redundancy.

There is the same problem when individual forms, banner, header or trailer pages are attached to the document via a Windows printer driver.

SUMMARY OF THE INVENTION

An object of the invention is to achieve a high throughput of documents given the output of document data from a computer to an output device.

This object is achieved by a method for the output of data from a computer system to an output device, whereby a master document having a variable data area and having a static data area is generated; the variable data area is marked; variable data are inserted into the variable data area, as a result whereof a serial data stream with individual documents arises, the individual documents respectively containing both variable data as well as static data; the variable data from the serial data stream are separated from the static data on the basis of the marking; the variable data separated from the static data from the first individual document are transmitted to the output device; the static data of the first individual document are stored in the output device; the static data of the following individual documents are not transmitted to the output device; and the variable data are in turn joined with the stored, static data individual document by individual document in the output device.

A further advantage is realized when a printer device is employed as the output device. The marking of the variable data area may ensue by means of a visually perceptible identification, particularly chromatically. The marking can be with a color that lies outside the printable color spectrum of the printer device.

According to a further development of the invention, the scope of the master document is indicated. Characteristic data, particularly position data, font data and/or color data, may be transmitted to the output device with the variable data. The static data can be stored in a macro datafile.

Advantages are realized when the serial data stream is generated in one of the printer languages PCL, PostScript or LCDS. The master document or the second document can be a document, particularly an overlay or a page segment, of the printer language IPDS. The master document or the second document may be a document of the print data language LCDS. The data output in a Windows system environment or in a windows-like system environment is preferably controlled via data that are input via a user interface.

In a further development of the method, the master document is generated; at least one second document is logically linked with the master document; and the data of the second document are sent to the output device separated from the data of the master document. The data of the second document may be stored in the output device. Specifically, the data of the master document are joined with the data of the second document for the output of an individual document. A logical linking can be carried out by referencing.

The area of the master document, particularly the page region, wherein the second document is to be linked with the master document can be specified. In one improvement, whether the second document is an overlay or a watermark document is indicated.

A further aspect of the invention provides a computer program product comprising elements for the implementation of the method as set forth above. The invention also provides a system for the implementation of a method.

The invention is based on the perception that a serial data stream wherein static and variable data are inseparably connected to one another individual document by individual document arises given the output of series documents from Windows® or a windows-like applications. The invention has recognized that a separation of these data into static and variable parts—even when these parts were already previously joined (packed)—allows the output on a printer device or some other output device to become significantly more efficient and high-performance.

According to a first aspect of the invention, a separation of static and variable data ensues during the output of the data. For example, the variable data are filtered out of the serial data stream and further-processed differently than the static data. Whereas the variable data are completely transmitted from the computer to the output device, the static data—insofar as they repeat—are transmitted only once from the computer to the output device. As a result thereof, the quantity of data can be considerably reduced and, thus, the performance capability of the transmission can be significantly enhanced.

In a system wherein variable and static data are initially connected to one another for each individual document, a renewed, individual document by individual document separation of the variable data from the static data ensues in an intermediate step according to this first aspect of the invention before the data are transmitted to the output device, particularly to a printer device. In order to be able to implement this separation, the variable data are previously provided with a suitable marking; in particular, they are identified chromatically. In particular, the marking already ensues in the production of the document by marking the wildcards at which the variable data are inserted. Preferably, the marking is no longer visible given the output of the data in the printer device.

The inventive separation between variable data and static data can already ensue in the source format of the application (for example, directly in the editor) or in an operation following the application, for example during the course of the conversion of a Windows document into the EMF format or within the EMF format. In particular, the separation can ensue in a following filtering for the EMF conversion and, in particular, given the conversion of the data stream into a print language such as PCL or postscript. The invention makes an intelligent printer driver possible with which extensive print data streams can be transmitted to a printer device at high speed.

According to the first aspect of the invention, a limitation of the static data particularly ensues, i.e. in particular about the scope that the data occupy. As a result of this limitation, a document-exact and location-exact allocation (referencing with corresponding referencing data) of the variable data to the static data can ensue in a simple way in the following filter operation.

According to a second aspect of the invention, a supplemental document, for example one or more PCL macros, is optionally attached to one or more arbitrary areas (pages) of an existing but arbitrary document at the beginning of the output, particularly of a print out. Particularly given series documents, it is thereby adequate to make the allocation only once for a master document.

The allocation can then be valid, i.e. activated, for all individual documents. The allocation ensues by means of a logical linking of the two documents, particularly by means of a referencing wherein corresponding referencing data are formed. Additional parameters can thereby preferably be recited, for example the position of the second document within the first document. The second document is particularly characterized in that it has a given, non-variable data content (for example, graphics areas or non-variable text constituents). Within a typical Windows® system environment, the referencing is thereby particularly controlled via data that are input via a user interface. The referencing then ensues within a converter unit that converts a windows-specific Enhanced Metafile data stream (EMF data stream) into a print data stream such as, for example, PCL® or PostScript®.

In advantageous embodiments of the second aspect of the invention, the page area of the master document wherein the second document is joined to the master document is indicated. The incorporation of the second document can ensue in various modes, for example as an overlay or as a watermark.

Packed datafiles multiply containing one and the same static data occur not only in PCL and postscript printing data streams but also definitely occur in AFPDS, IPDS and in LCDS data streams. Further, documents/data streams that are generated in a first printer language (for example, in PostScript) can also have data (documents, macro datafiles) that have been generated in other languages (for example, IPDS overlays, IPDS page segments or PCL macros) embedded in them. The invention is therefore suited for the optimum output of any data streams.

What is particularly understood as an output device for the invention is a printer device. Nonetheless, the invention can also be employed in conjunction with other output devices by themselves or in combination with a printer device. For example, a print server, a CD-ROM writer device or a print data archive can also serve as the output device, as disclosed in the PCT Patent Application PCT/EP98/05460. The content of this application or, respectively, of the publications resulting therefrom are herewith incorporated by reference into the present specification.

BRIEF DESCRIPTION OF THE DRAWINGS

Exemplary embodiments of the invention are explained in greater detail below on the basis of some Figures.

DETAILED DESCRIPTION OF THE PREFERRED EMBODIMENTS

Figure 1:
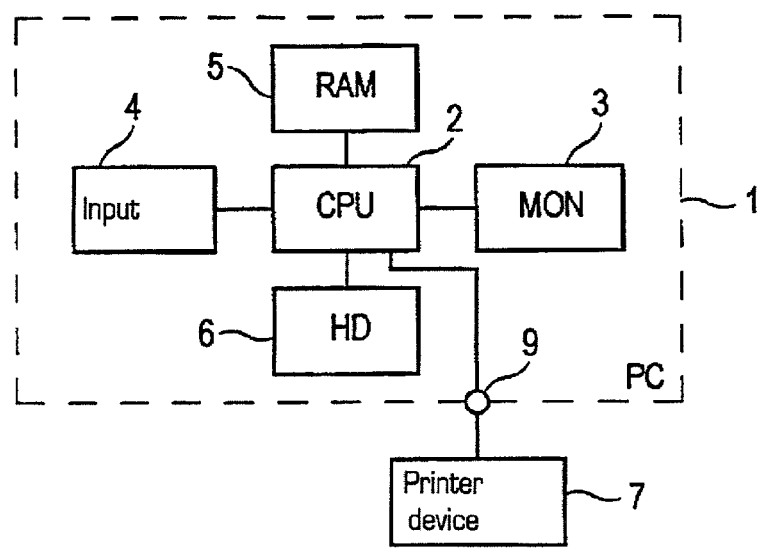
FIG. 1 is a functional block diagram of a printing system.
Figure 2:
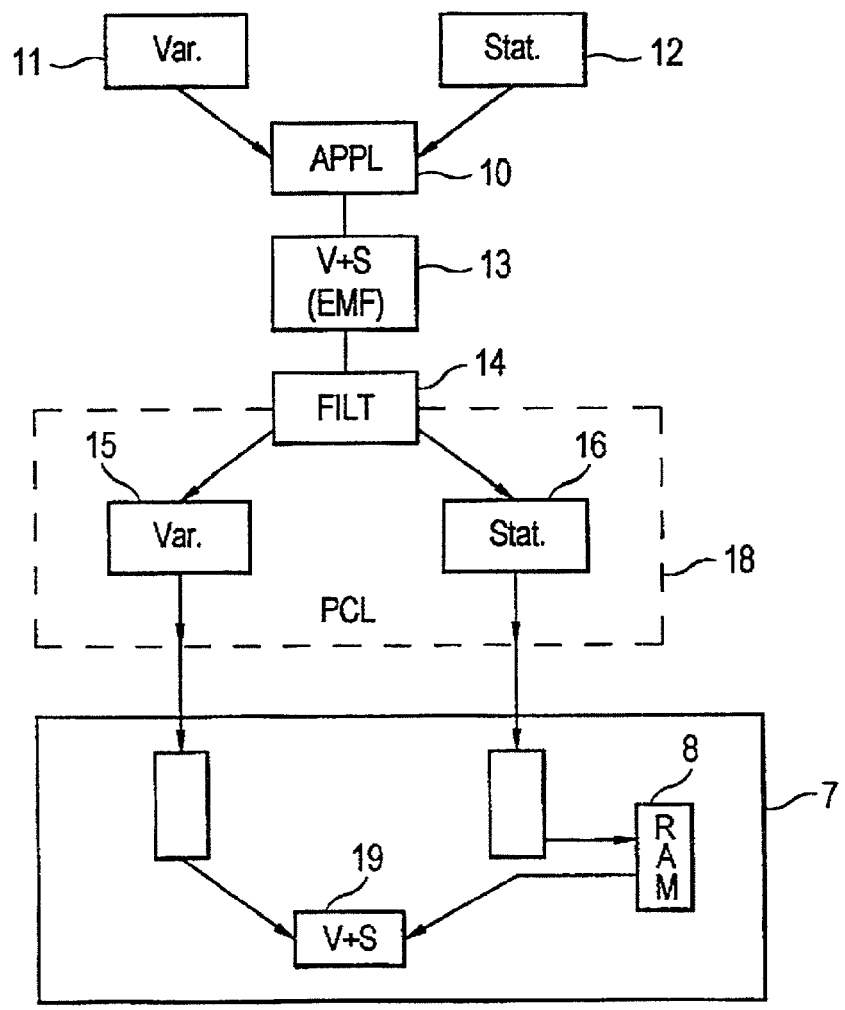
FIG. 2 is a functional block diagram of a data stream in the printing system.

FIG. 1 shows a personal computer 1 with a connected printer 7. In a known way, the personal computer 1 contains a central processor unit (CPU) 2, a monitor 3 connected thereto, as well as an input device 4 (keyboard, mouse, touch screen or the like), a main memory 5 and a hard disk 6. The computer 1 is connected to the printer 7 via the interface 9. The personal computer 1 is operated with an operating system, for example with Microsoft Windows 95® or Windows NT. Various application programs in turn run under this operating system, for example the application 10 Winword 97® from the Microsoft Office 97® package. How variable and static data of a series letter from the Winword application are printed is explained with reference to the example of FIG. 2. Variable data 11 and static data 12 that are stored in the main memory 5 and/or on the hard disk 6 are thereby incorporated into the application. For this purpose, the user can produce a master document in the Winword program 10, static data areas and variable data areas being provided in the master document. The variable data areas are intended to be filled with variable data that are stored in a separate datafile (a Word document, data bank, an Excel document, etc.). Further details about this series letter production are set forth, for example, on pages 75 through 93 in the book by Rainer-Walter Schwabe, *Word 97: leicht, klar, sofort*, Markt-und Technik-Verlag, Haar (1997), ISBN 3-8272-5267-3. This description is herewith incorporated by reference into the present specification.

Wildcards for the variable data are thereby created in the variable data areas of the Winword master document, for example with the particular <<name>>. When the series letter is called, the variable datum in these wildcards is then taken record-by-record from the field "Name" of the datafile that contains the variable data.

In order to print out the series letter, i.e. the individual documents with the respectively inserted, variable data, the wildcards for the variable data, for example <<name>>, are distinguished from the static data of the master document with a suitable marking. This occurs, for example, by formatting the wildcards in a specific color. The color should thereby be selected such that the printer is not in the position of printing out data in this color. A color is thus employed that lies outside the reproducible color spectrum of the printer. This type of marking can assure that the visual appearance of the document output on the printer 7 is not affected by the marking. The marking can ensue in a known way within the application 10, i.e. with the command "Format|Character" of the application Word for Windows in the present example.

Before a document is printed out from the application, two particulars that control the rest of the printout must be produced. First, what properties the marking of the wildcards for variable data has must be specified. In the present example, this is the marking of the wildcards with the color red (also see FIG. 4). Second, the scope of the mater document must be indicated. The individual documents of the series letter can be distinguished or, respectively, separated from one another with this particular in the later filter operation.

For printing out the series letter, the wildcards in the variable data areas of the master document is replaced record-by-record in the application 10 by the corresponding variable data 11 of the variable data memory, and a data stream or, respectively, a datafile of the entire document, i.e. of the static and of the variable data, is generated in the Enhanced Metafile Format (EMF) 13. In this EMF spooling, which is implemented via a Windows printer driver given output of the series letter, each individual document of the series letter or, respectively, of the series document is respectively newly constructed from the master document. In order to avoid a redundant data repetition of the static data, the static part 16 and the variable part 15 of the individual documents from the series letter data stream are respectively separated from one another in the filter operation 14. The variable data are thereby recognized on the basis of their marking that was previously undertaken as described above. In addition to this marking information, the scope of the master document, for example the number of pages it fills, is also needed in this filter operation. As a result thereof, the individual documents can be distinguished from one another in the filter event.

In the filter event 14, the static data are separated from the variable data on the basis of the marking of the variable data and on the basis of the indicated limitation (number of pages of the master document). The static data are transmitted to the printer device 7 and are stored as form or macro thereat in the main memory 8. The capacity of the main memory is thereby fashioned of such a size that a plurality of documents (macros, forms) as well as their appertaining referencing data can be simultaneously stored therein. The main memory, as RAM (Random Access Memory), can thereby typically amount, for example, to 4, 8, 64, 128, 512 or even more megabytes (MB) or can also be fashioned as a hard disk with memory capacities of a number of gigabytes that are typical thereof. A combination of the two memory types (RAM, hard disk) can also be meaningful, whereby documents (macros, etc.) of a print job that are called more often are stored in the RAM and documents that are called less often, for example documents (macros) of the print job that are called only once, are stored on the hard disk.

The variable data, in contrast, together with all needed characteristics (for example, indications of position on the individual document, color particulars, font particulars) are separately transmitted, likewise to the printer device. The transmission of the variable data and of the static data from the computer system 1 to the printer device 7 can ensue via the same data line, whereby, however, a logical discrimination (separability) between the data must be retained.

Beginning with the second individual document, only the filtered, variable data are then transmitted to the printer device 7, as a result whereof a considerable reduction of the data stream between the computer system 1 and the printer system 7 is achieved.

Within the printer device 7, the received, variable data are mixed again with the static data and printed in common on a recording medium (paper, labels, films, etc.).

In the second and in all further individual documents, the static data 16 are discarded in the computer 1 or, respectively, within the PCL converter 18 and are not transmitted to the printer device 7. In contrast, the variable data 15 together with their characteristic particulars are transmitted to the printer device individual document by individual document. In the printer device 7, these variable data 15 are then merged by an OR-operation with the static data stored in the memory 8 to form merged variable and static data 19.

The filter event 14 precedes the conversion of the data into a PCL data stream. However, it occurs within the PCL converter 18.

A postscript converter or some arbitrary other converter that is standard in the respective system environment can also be employed instead of a PCL converter. The filter event 14 can also be directly applied onto the EMF intermediate datafile or, respectively, the EMF intermediate data stream 13 or can be applied to the source text of the editor (for example, in Word). The filtered, variable data 15 or, respectively, static data 16 then already enter in the PCL converter.

Figure 3:
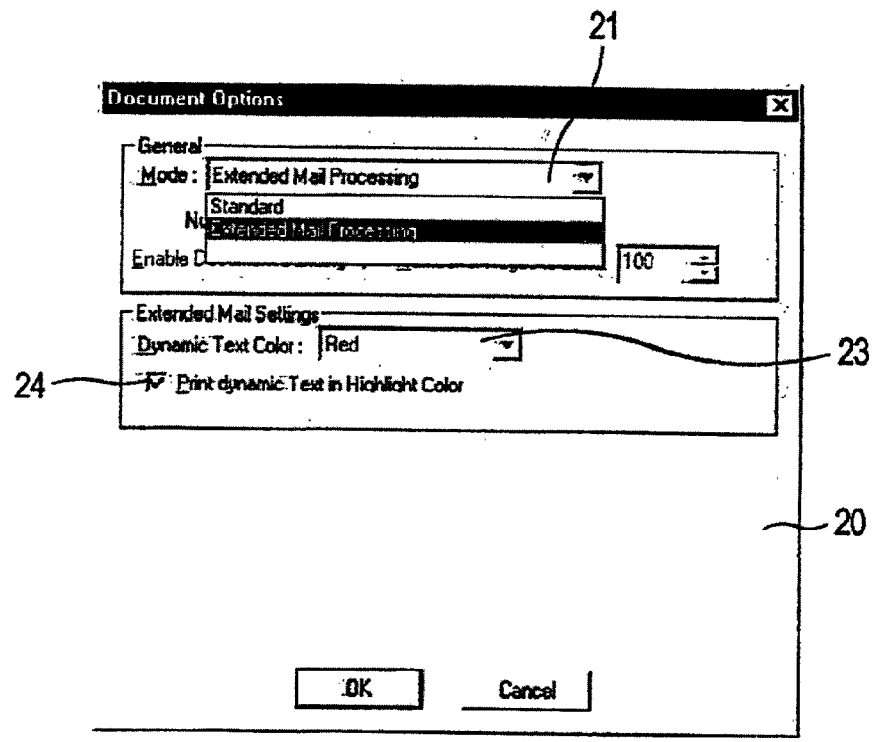
FIG. 3 is a computer screen illustration of a dialog box for a selection mask.

FIG. 3 shows a selection window that is selected before the printing event from the application ensues into the EMF intermediate datafile (event 13). The input window 20 contains a first selection window 21 in which two print modes can be selected. In the first print mode (standard), print data from the windows application are printed out in a standard way, i.e. the filter procedure (event 14) does not occur. Series letters are then transmitted to the printer device 7 individual document by individual document. The above-described filter procedure (event 14) is activated by selecting the option "extended mail processing" in the mode window 21.

The scope of the master document can be specified in the selection window 22. As a result thereof, the separation of the individual document pages is enabled in the filter event.

Figure 4:
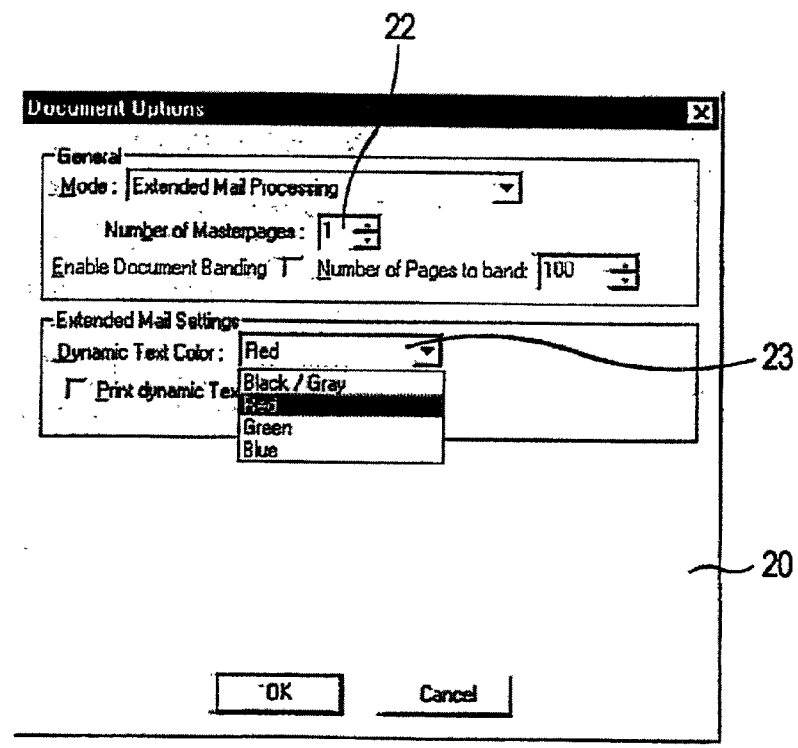
FIG. 4 is a computer screen illustration of a dialog box for a second selection mask.

The color property with which the wildcards of variable data were marked in the master document is indicated in the selection window 23. FIG. 4 shows various selection fields (black/gray, red, green, blue) for these markings.

Whether the dynamic texts are to be printed differently in the printer device 7, for example in a highlight color, can be optionally indicated in the selection window at 24 in FIG. 3. This assumes that the printer device is in the position to print in two colors, whereby the standard texts are printed in the first color and the dynamic texts are printed in the second color. The first color, for example, is thereby black and the second color is blue (a highlight color) or vice versa.

In a further embodiment of the invention, the dynamic texts can be marked in a first color that cannot be presented by the printer. The variable data marked in this way are printed out in the same color as the static data. Other variable data, in contrast, are marked in a second color and printed out in the second ink (the highlight color) of the printer device.

Figure 5:
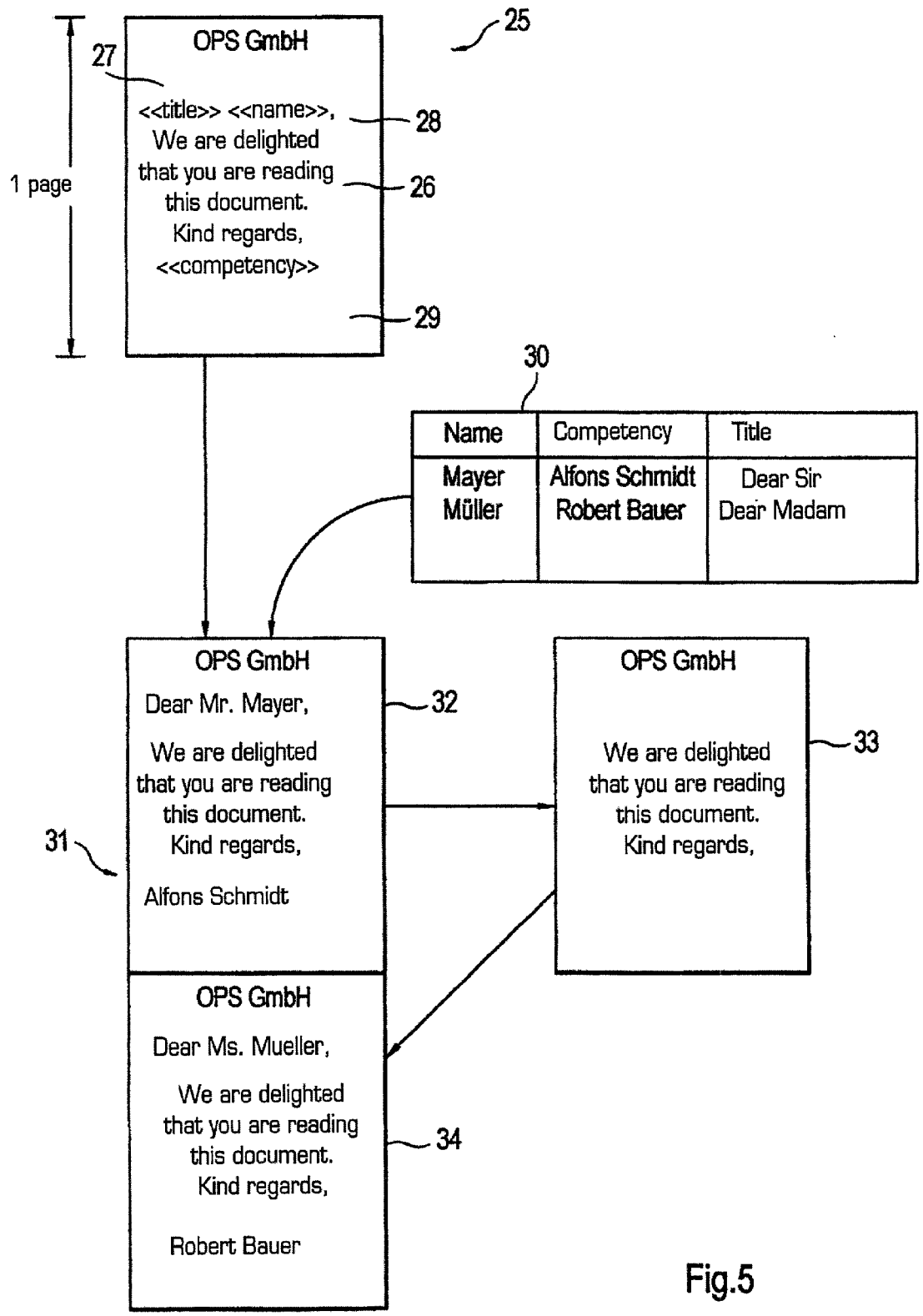
FIG. 5 is a block diagram illustrating the assembly of a series document.

FIG. 5 shows a master document 25. It is composed of static data 26 and of the three variable wildcards 27, 28 and 29 (title, name, competency). The length of the master document amounts to one page. Variable data are stored in the datafile 30 in the fields name, competency and title. The master document 25 and the variable data 30 are combined into the series document 31, whereby the static text part 33 that corresponds to the static data 16 (FIG. 2) is extracted from the first series document 31. These data are employed for generating the second individual document 34 (see FIG. 2).

Figure 6:
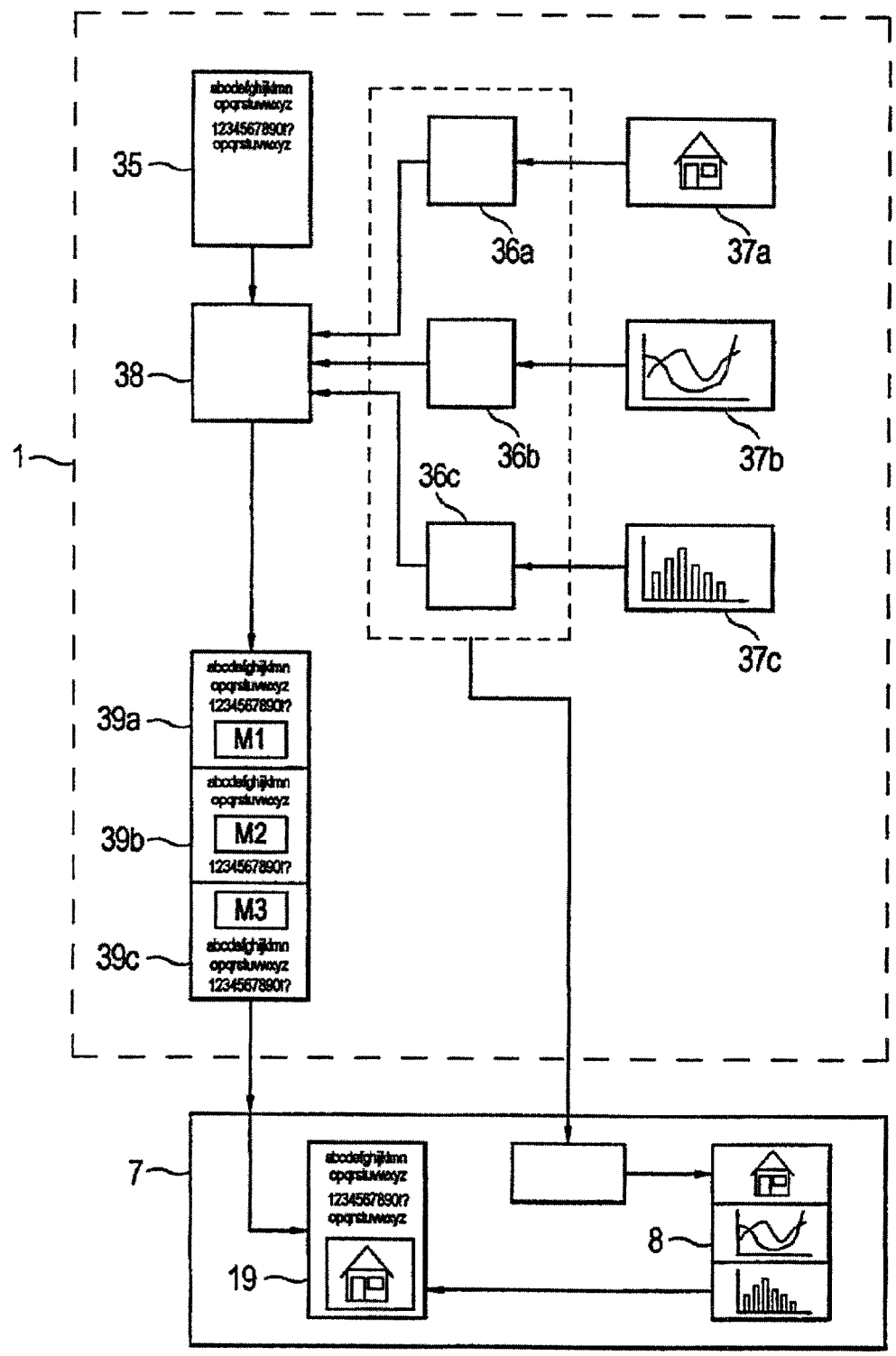
FIG. 6 is a block diagram which shows a second data stream.

FIG. 6 shows how an auxiliary information can be linked into an existing document. As indicated in the preceding examples or, respectively, Figures, let the application here also be the program Winword. A macro 36 that contains an external data source 37 is linked into the Winword document 35. For example, the macro 36a contains an image datafile 37a. The macro 36b contains a line diagram 37b and the macro 37c contains a bar diagram 37c. In the event 38, the macros 36a, 36b and 36c can be optionally selected either individually or a plurality of them at once for linking into the Winword document 35. On which pages and at which position within the individual pages of the Winword document 35 the macro or the respective macros are to be placed is also indicated in this event. A print data stream 39 is generated therefrom, whereby the individual pages 39a, 39b and 39c are provided with the respective reference index macro data M1, M2, M3.

These information (reference index data M1, M2, M3) are converted into the PCL language and are sent to the printer device 7. Simultaneously, the macro information (particularly graphics data) are converted (insofar as they are not already in PCL format) and are transmitted into the printer device 7 separated from the series letter information, i.e. separated from the series print data stream in terms of time and/or in data-oriented fashion, and are deposited in the main memory 8 thereat. A plurality of and, in particular, all complete macro data (graphics information, etc.) required for the print job are thereby stored in the main memory 8. Within the printer device 7, the series letter data (i.e. the series print data stream) are then reunited with the corresponding, complete macro data upon employment of the reference index data M1, M2, M3, i.e. the page 39a is output upon employment of the reference index M1 with the macro 36a (i.e. with the complete print data of the macro 36a), the page 39b is output upon employment of the reference index M2 with the complete data of the macro 36b, and the page 39c is output upon employment of the reference index M3 with the data of the macro 36c. The referencing, i.e. the logical linking between specific document pages (39a, 39b, 39c) with the allocated macros 36a, 36b and 36c, occurs in the unit 38 in that the reference indices or, respectively, reference index data M1, M2 and M3 are formed.

In the example of FIG. 6, the individual document comprises the three pages 39a and 39b, 39c. When the document 35 is a series document, then it suffices to make the allocation for an individual document (master document), so that this allocation is valid for all individual documents. The individual documents can thereby be individual pages or—as shown in FIG. 6—can comprise a plurality of pages. The advantage of this procedure described for the macro linking is once again that the reoccurring information—macros here—need be transmitted only once from the computer 1 to the printer device 7 and can be linked from the main memory in the computer to individual documents as often as desired. Here, too, the quantity of data to be transmitted between the computer 1 and the printer device 7 is minimal because macros in the individual documents are not transmitted completely but only by indicating their reference index 2 (M1, M2, M3).

Figure 7:
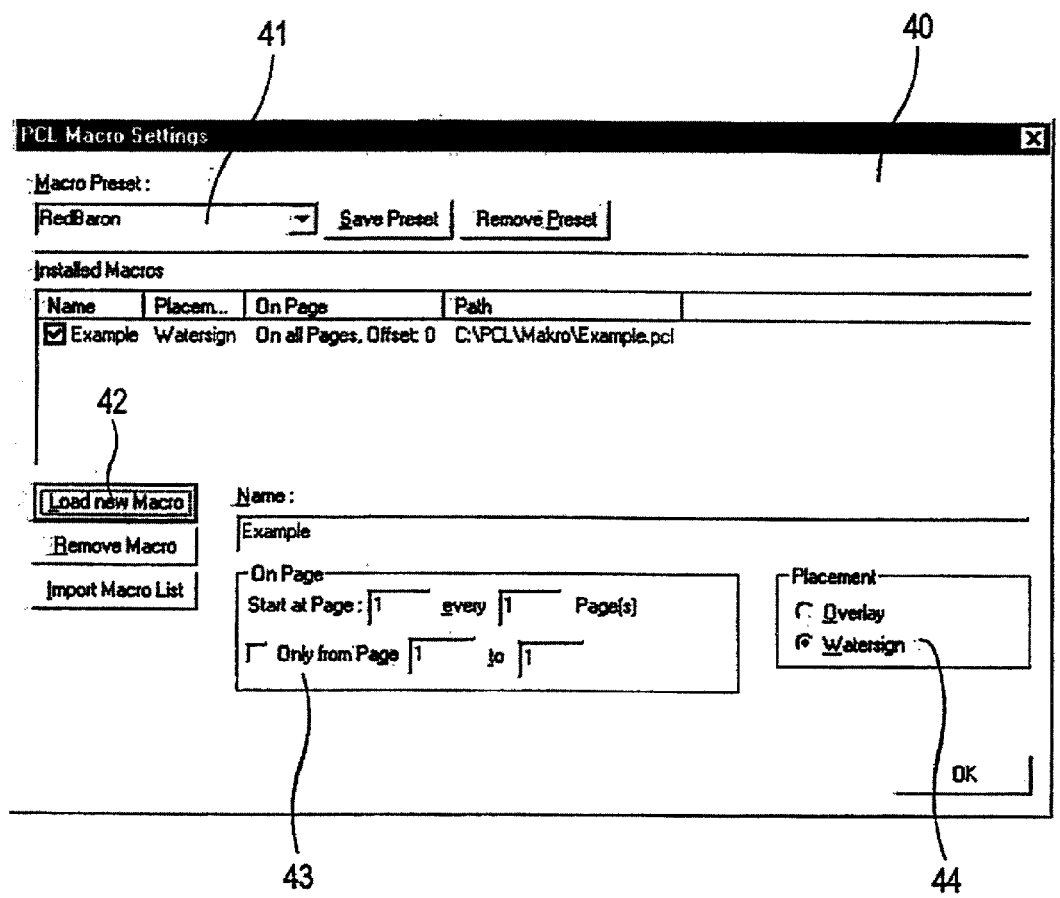
FIG. 7 is a computer screen illustration showing a dialog box for a further selection mask.

FIG. 7 shows a selection window that is called in the referencing unit 38 in the computer 1. Presets for macros can be undertaken in the window 41, i.e. standardized macro collections and/or links to specific document pages can be deposited. Additional, new macros can be selected for a macro preset via the selection key 42. The position of the macro on specific document pages can be defined in the selection field 43, for example on all pages, on even-numbered or odd-numbered pages or on specific page numbers. The placement type as an overlay (complete superimposition) or a watermark (macro information only in the background) within the document can be selected with the selection field 44.

Figure 8:
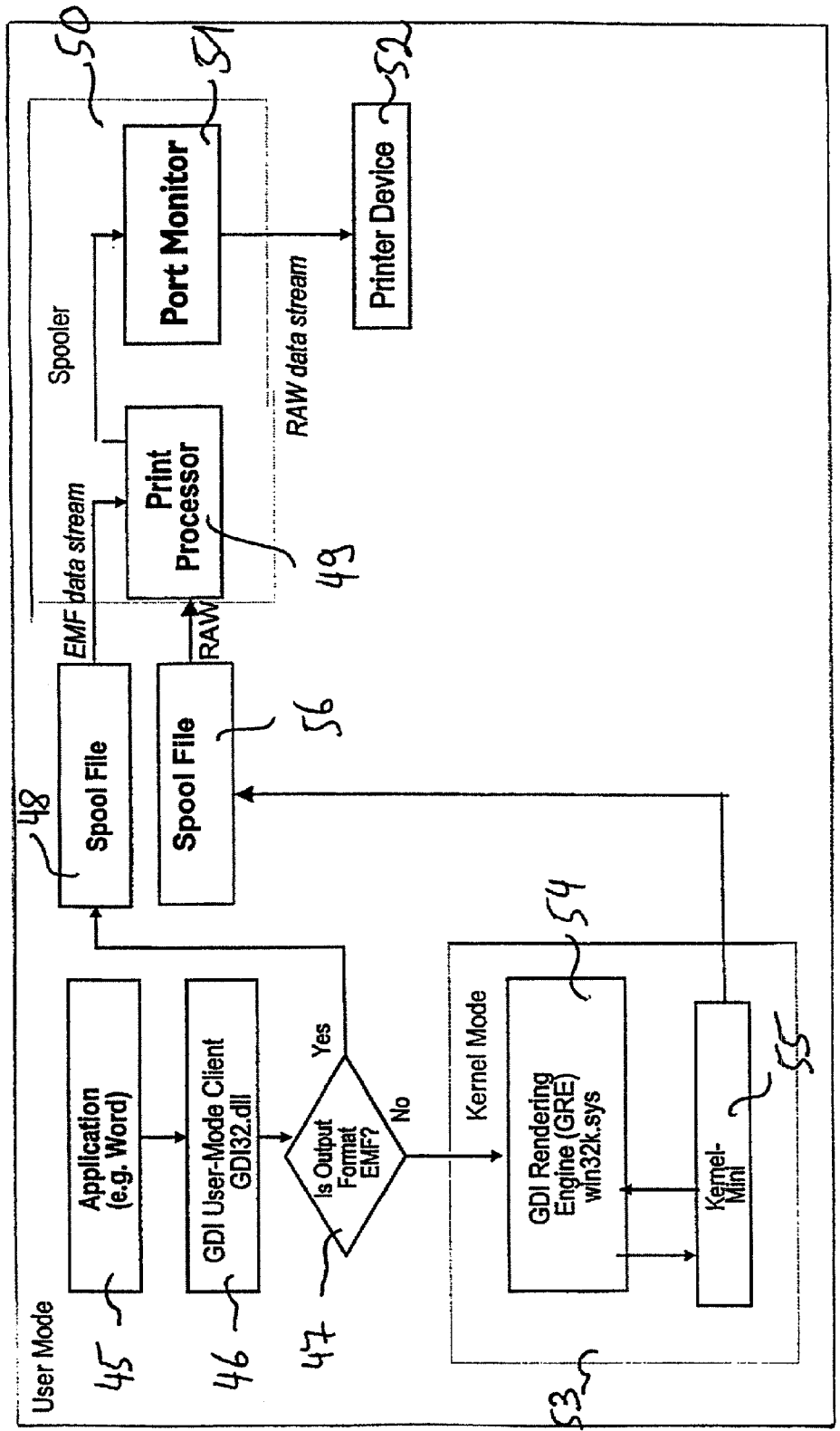
FIG. 8 is a functional block diagram of a print operation in a standard Windows system environment.

FIG. 8 shows a structure diagram according to which a print event normally sequences within a Windows® operating system running on a computer. What is referred to as a "User-Mode Client" (GDI32.dll) 46 is thereby called proceeding from an application 45, this "User-Mode Client" 46 driving the display device (Graphic Device Interface, GDI). Various printer drivers can thereby be called and the settings of the appertaining printer supported by the respective driver can be set job-specifically. After these settings have been carried out and the print job has been enabled (pressing "OK"), a standard check is carried out under Windows to see whether the output format that is thereby generated corresponds to the EMF standard (EMF stands for Enhanced Metafile Format). When this is the case, the print data stream is supplied as EMF data stream to a print processor 49 situated in the spooler 50, being supplied thereto via a spool datafile 48. The data are supplied therefrom to a port monitor 51 and are supplied to the destination printer device 52 as what is referred to as a RAW data stream, i.e. as data stream in a printer language such as, for example, PCL that is matched to the destination printer device. The port monitor 51 thereby controls the output of the data to the output channel (LPT1, LPT2) of the computer allocated to the destination printer device.

When the query 47, however, yields that the document generated in the application 45 is not in EMF format, then what is referred to as a kernel mode 53 is activated wherein a GDI rendering engine (GRE), i.e. the program element "win32k.sys" 54 collaborates with the kernel mini control module 55. A RAW data stream is thereby generated that, as a RAW spool datafile 56, is in turn supplied to the print processor 49 in the spooler 50. From there, the handover via the port monitor 51 to the output device 52 in turn ensues as a RAW data stream.

Figure 9:
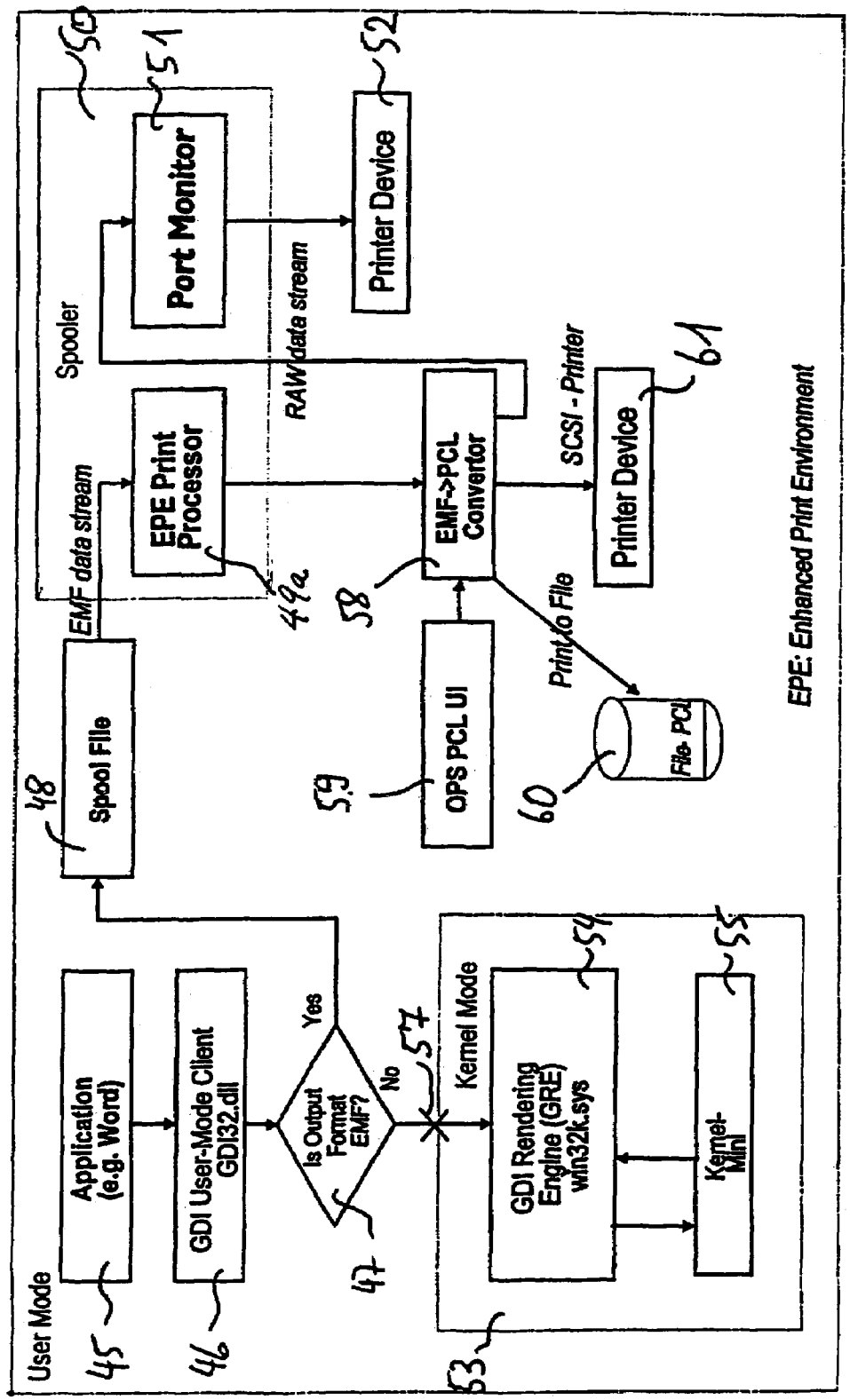
FIG. 9 is a functional block diagram of a print operation in a modified Windows system environment.

How the aspects of the invention described in conjunction with FIGS. 6 and 7 are implemented within a Windows environment becomes clear in FIG. 9. As a result of the invention, the referencing of various documents (maser document, macro, overlay) in such a Windows® environment is controlled via data that are input via a user interface or, respectively, via an input module 59. The referencing ensues within a converter unit 58 that converts a windows-specific Enhanced Metafile data stream (EMF data stream) into a PCL print data stream (a RAW data stream of the destination printer).

The processing of a data output (printing) proceeding from the application 45 (for example, Word) initially ensues according to FIG. 9 exactly as in the standard Windows® environment according to FIG. 8. However, an inventively modified driver is employed as the printer driver in FIG. 9, this generating a data stream in the EMF format, as a result whereof a spool file 48 is directly generated under Windows or, respectively, via the query 47, and the spool file is supplied to an inventively adapted print processor 49a in the Windows spooler 50. The kernel mode 53 or, respectively, the modules GRE 54 and kernel mini 55 called therein are not supported by the driver, this being indicated by the cross 57 in FIG. 9.

Another inventive adaptation is comprised in the print processor 49a that is located in the spooler 50. In contrast to the standard Windows environment of FIG. 8, this "Enhanced Print Environment (EPE) Print Processor" 49a does not forward the EMF data directly to the port monitor 51 but calls the converter unit 58, wherein the EMF data stream is converted into a PCL print data stream 60. The conversion is thereby controlled by the parameters that were previously input via the input module 59 (OPS PCL user interface). Among other things, the input module 59 effects the display of the macro window 40 shown in FIG. 7 for this purpose. The output can also ensue into various channels via settings that are either controlled via the input module 59 or, too, directly via the printer driver, which collaborates with the GDI user mode client 46. The output of these PCL-RAW print data can thereby ensue either into an output datafile (channel 1) that, for example, is stored on a hard disk or directly to an SCSI-capable printer 61 (channel 2) or back again into the spooler 50 to the port monitor 51 and from the latter via a standard interface (channel 3) to a destination printer device 52.

Exemplary embodiments of the invention have been described. It is thereby clear that, instead of the described Winword application program, other applications, presentation programs, table calculation programs, image processing programs beside text processing programs or other programs standard in the computer field can effectively use the invention. Instead of the PCL printer language that has been described, of course, other printer languages can also be employed, for example PostScript, AFPDS, IPDS, PDF or LCDS, particularly when a completely packed data stream is present that is not resolved into individual constituents such as scripts, forms, etc.

The invention has created an intelligent printer driver or, respectively, an intelligent pre-stage for printing with which the data stream between an application computer and a printer device can be significantly reduced. As a result thereof, a higher document throughput can be achieved in the output. The invention can be applied both in a single-location system wherein a computer is connected to a printer as well as in a network system wherein a plurality of computers send print data to one or more printer devices. Instead of transmitting the data directly to the printer device, they can be sent from the printing system in which the data are generated to the printer via a print server. Such a system is described, for example, in *Druckerbuch*, edited by Dr. Gerd Goldmann, Océ Printing Systems GmbH, Poing, Edition 3c (May 1998), ISBN 3-00-001019-X, pages 12-1 through 12-8. This description as well as the corresponding English-language description in *The World of Printers*, edited by Dr. Gerd Goldmann, Océ Printing Systems GmbH, Edition 3a (November 1998), ISBN 3-00-001081-5, pages 12-1 through 12-8, are herewith likewise incorporated by reference into the present specification.

When the inventive separation between variable data and static data already ensues in the source format of the application (for example, directly in the editor), then it is possible to further automate or, respectively, accelerate the output of data streams in that the static part is further-processed separately from the variable part, for example by conversion of the static part into a macro datafile (for example, in PCL), transmission to the output device, storing thereat and loading the macro in the print generator as needed. The filtering of the data stream can be eliminated by means of this further automation step.

The invention is particularly suited for use in Windows systems and in windows-like systems such as the Linux or Macintosh operating systems that at least partly comprise identical or similar systems components as Windows.

The invention can appear in the greatest variety of embodiments, for example as a computer datafile, as a program module, as a program element, as a program library or as a collection of a plurality of individual datafiles. This embodiment of the invention, which is particularly contained in computer program products such as a memory element, a diskette, a disk storage, a CD-ROM, a programmable electronic module (ROM, PROM, EPROM), can also be spread via data networks, for example as datafile attachment of an e-mail as well as via the Internet.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for output of data from a computer system to an output device, comprising the steps of:
   generating a master document having a variable data area and having a static data area;
   marking said variable data area;
   inserting variable data into said variable data area to provide a serial data stream with individual documents, said individual documents respectively containing both variable data as well as static data;
   separating said variable data of said serial data stream from said static data on a basis of said marking;
   transmitting said variable data separated from said static data from a first individual document to the output device;
   storing said static data of said first individual document in said output device;
   said static data of following individual documents are not transmitted to said output device; and
   joining said variable data in turn with the stored static data individual document by individual document in said output device;
   said marking step of said variable data area ensues by a visually perceptible identification, said visually perceptible identification is a chromatic marking that appears on the printed document in the same color as the static data when printed.

2. A method as claimed in claim 1, wherein said output device is a printer device.

3. A method as claimed in claim 1, wherein said output device is a printer device, and said marking ensues with a color that lies outside a printable color spectrum of said printer device so that the variable data is not printed in said color of said chromatic marking but is printed in a same color as the color of the static data.

4. A method as claimed in claim 1, further comprising the step of:
   indicating a scope of said master document.

5. A method as claimed in claim 1, further comprising the step of:
   transmitting characteristic data to said output device with said variable data.

6. A method as claimed in claim 4, wherein said characteristic data includes at least one of: position data, font data and color data.

7. A method as claimed in claim 1, further comprising the step of:
   storing said static data in a macro datafile.

8. A method as claimed in claim 1, further comprising the step of:
   generating said serial data stream in one of the printer languages PCL, PostScript and LCDS.

9. A method as claimed in claim 1, wherein one of said master document and a second document is a document of printer language IPDS.

10. A method as claimed in claim 9, wherein said document of printer language IPDS is one of an overlay and a page segment.

11. A method as claimed in claim 1, wherein one of said master document and said second document is a document of print data language LCDS.

12. A method as claimed in claim 1, further comprising the step of:
    controlling said data output in one of a Windows system environment and a windows-like system environment via data that are input via a user interface.

13. A method as claimed in claim 1, further comprising the steps of:
    generating said master document;
    linking at least one second document logically with said master document; and
    sending data of said at least one second document to said output device separated from the data of said master document.

14. A method as claimed in claim 13, further comprising the step of:
    storing the data of said at least one second document in said output device.

15. A method as claimed in claim 13, further comprising the step of:
    joining the data of said master document with data of said at least one second document for output of an individual document.

16. A method as claimed in claim 13, wherein said step of logical linking ensues via a referencing.

17. A method as claimed in claim 13, further comprising the steps of:
    specifying an area of said master document wherein said at least one second document is to be linked with said master document.

18. A method as claimed in claim 16, wherein said area of said master document is a page region.

19. A method as claimed in claim 12, wherein said second document is one of an overlay and a watermark document.

20. A computer program product embodied on a computer readable media and operable to perform the steps of:
    generating a master document having a variable data area and having a static data area;
    marking said variable data area;
    inserting variable data into said variable data area to provide a serial data stream with individual documents, said individual documents respectively containing both variable data as well as static data;
    separating said variable data of said serial data stream from said static data on a basis of said marking;
    transmitting said variable data separated from said static data from a first individual document to the output device;
    storing said static data of said first individual document in said output device;
    said static data of following individual documents are not transmitted to said output device; and
    joining said variable data in turn with the stored static data individual document by individual document in said output device;
    said marking step of said variable data area ensues by a visually perceptible identification, said visually perceptible identification is a chromatic marking that is outside a printing range of a printer and which prints the variable data in a same color as a color of said static data.

21. A system for implementation of a method including at least one computer to perform a method for output of data from a computer system to an output device, including:

generating a master document having a variable data area and having a static data area;

marking said variable data area;

inserting variable data into said variable data area to provide a serial data stream with individual documents, said individual documents respectively containing both variable data as well as static data;

separating said variable data of said serial data stream from said static data on a basis of said marking;

transmitting said variable data separated from said static data from a first individual document to the output device;

storing said static data of said first individual document in said output device;

said static data of following individual documents are not transmitted to said output device; and joining said variable data in turn with the stored static data individual document by individual document in said output device;

said marking step of said variable data area ensues by a visually perceptible identification, said visually perceptible identification is a chromatic marking, said static data being printed by a printer in a color, said variable data being printed by the printer in the same color as said static data.

* * * * *